(12) United States Patent
Huo et al.

(10) Patent No.: US 11,451,792 B2
(45) Date of Patent: Sep. 20, 2022

(54) CHROMA INTRA PREDICTION METHOD AND DEVICE

(71) Applicant: GUANGDONG OPPO MOBILE TELECOMMUNICATIONS CORP., LTD., Guangdong (CN)

(72) Inventors: Junyan Huo, Guangdong (CN); Yanzhuo Ma, Guangdong (CN); Shuai Wan, Guangdong (CN); Fuzheng Yang, Guangdong (CN); Xinwei Li, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/361,625

(22) Filed: Jun. 29, 2021

(65) Prior Publication Data
US 2021/0329259 A1 Oct. 21, 2021

Related U.S. Application Data

(63) Continuation of application No. PCT/CN2019/070148, filed on Jan. 2, 2019.

(51) Int. Cl.
*H04N 19/105* (2014.01)
*H04N 19/159* (2014.01)
(Continued)

(52) U.S. Cl.
CPC ......... *H04N 19/159* (2014.11); *H04N 19/105* (2014.11); *H04N 19/176* (2014.11); *H04N 19/186* (2014.11)

(58) Field of Classification Search
None
See application file for complete search history.

(56) References Cited

U.S. PATENT DOCUMENTS

2013/0272401 A1    10/2013   Lee et al.
2013/0336591 A1    12/2013   Jeon
                            (Continued)

FOREIGN PATENT DOCUMENTS

CN    101820546 A    9/2010
CN    107211121 A    9/2017
                    (Continued)

OTHER PUBLICATIONS

International Search Report in the international application No. PCT/CN2019/070148, dated Sep. 27, 2019.
(Continued)

*Primary Examiner* — Mohammad J Rahman
(74) *Attorney, Agent, or Firm* — Perkins Coie LLP

(57) ABSTRACT

A chroma intra prediction method and device are provided. The method applied to a decoder includes parsing bitstream data corresponding to a current chroma block, and determining that a prediction mode corresponding to the current chroma block is a direct mode (DM); determining an intra prediction mode of the current chroma block from a set of chroma prediction modes, wherein the set of chroma prediction modes comprises at least one of DM, LM, LM_T or LM_L; and determining a reconstructed value of the current chroma block according to the intra prediction mode.

22 Claims, 8 Drawing Sheets

---

DM corresponding to the current chroma block is acquired from bitstream data corresponding to a current chroma block.    / 101

A set of chroma prediction modes is acquired according to a modified candidate mode, when the DM is a DC mode or a Planar mode; wherein the set of chroma prediction modes used in performing chroma reconstruction on the current chroma block    / 102

(51) Int. Cl.
*H04N 19/176* (2014.01)
*H04N 19/186* (2014.01)

(56) References Cited

U.S. PATENT DOCUMENTS

| | | |
|---|---|---|
| 2017/0006285 A1 | 1/2017 | Lin et al. |
| 2017/0105025 A1 | 4/2017 | Jeon et al. |
| 2017/0366818 A1* | 12/2017 | Zhang .................... H04N 19/70 |
| 2018/0048911 A1 | 2/2018 | Jeon et al. |
| 2018/0205946 A1* | 7/2018 | Zhang .................... H04N 19/11 |
| 2018/0241995 A1* | 8/2018 | Son ........................ H04N 19/11 |
| 2018/0310024 A1 | 10/2018 | Jeon et al. |
| 2019/0230352 A1* | 7/2019 | Heo ..................... H04N 19/513 |
| 2019/0281321 A1* | 9/2019 | Zhao .................... H04N 19/625 |
| 2019/0342568 A1* | 11/2019 | Zhao .................... H04N 19/159 |
| 2020/0014924 A1* | 1/2020 | Zhao .................... H04N 19/46 |
| 2020/0322635 A1* | 10/2020 | Koo ..................... H04N 19/625 |
| 2020/0359033 A1* | 11/2020 | Ramasubramonian ...................... H04N 19/157 |
| 2021/0037259 A1* | 2/2021 | Ko ........................ H04N 19/157 |
| 2021/0067802 A1* | 3/2021 | Jin ........................ H04N 19/117 |
| 2021/0136408 A1* | 5/2021 | Racape ................. H04N 19/80 |
| 2021/0274184 A1* | 9/2021 | Park ..................... H04N 19/186 |

FOREIGN PATENT DOCUMENTS

| | | |
|---|---|---|
| CN | 108540810 A | 9/2018 |
| RU | 2542884 C2 | 2/2015 |
| WO | 2012171463 A1 | 12/2012 |
| WO | 2018236031 A | 12/2018 |

OTHER PUBLICATIONS

Rath, G. et al. "CE3-related: DM-dependent chroma intra prediction modes", JVET-M0100; JVET of ITU-T SG 16 WP 3 and ISO/IEC JTC 1/SC 29/WG 11; 13th Meeting: Marrakech, MA, Jan. 9-18, 2019. 5 pages.

Chen J et al:"Algorithm description for Versatile Video Coding and Test Model 3 (VTM 3)" JVET-L1002-v1; JVET of ITU-T SG 16 WP 3 and ISO/IEC JTC 1/SC 29/WG 11; 12th Meeting: Macao, CN, Oct. 3-12, 2018. 48 pages.

Supplementary European Search Report in European application No. 19907559.9, dated Nov. 3, 2021. 7 pages.

First Office Action of the European application No. 19907559.9, dated Mar. 18, 2022. 5 pages.

First Office Action of the Russian application No. 2021121313, dated Mar. 30, 2022. 13 pages with English translation.

Office Action of the Indian application No. 202127030756, dated Mar. 15, 2022. 6 pages with English translation.

* cited by examiner

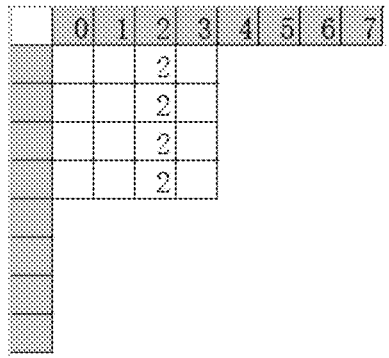

FIG. 4

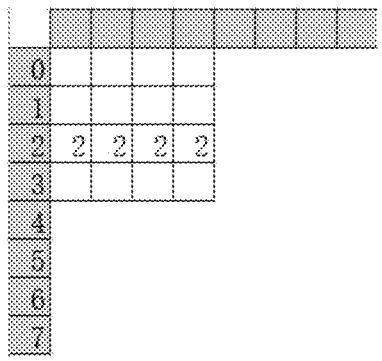

FIG. 5

| Serial number | Type | Prediction manner |
|---|---|---|
| 1 | DM | Prediction mode for the central luma block |
| 2 | CCLM CCLM_L CCLM_T | Construct the prediction signal with the scheme (a*luma value +b) CCLM calculates a and b based on the left column of the upper row CCLM_L calculates a and b using the left column CCLM_T calculates a and b using the upper row |
| 3 | DC | Replaced with the angular mode with prediction direction index number 66 |
| 4 | PLANAR | Replaced with the angular mode with prediction direction index number 66 |
| 5 | VER | Replaced with the angular mode with prediction direction index number 66 |
| 6 | HOR | Replaced with the angular mode with prediction direction index number 66 |

FIG. 6

CHROMA INTRA PREDICTION METHOD AND DEVICE

CROSS-REFERENCE TO RELATED APPLICATION

The present application is a continuation of PCT Application No. PCT/CN2019/070148, filed on Jan. 2, 2019, the contents of which are incorporated herein by reference in their entirety.

BACKGROUND

In the next-generation video coding standard H.266 or Versatile Video Coding (VVC), it is supported that the luma and chroma are coded in separate partitioned blocks, and one chroma block may correspond to multiple luma blocks. However, the existing Direct Mode (DM) can only reflect the local texture features in the central region of the current chroma block. It is unreasonable to use a single DM for chroma prediction when one chroma block corresponds to multiple luma blocks at the same location. For example, when the DM is the Direct Current (DC) mode or Planar mode, the current chroma block may be considered flat and smooth. However, if the corresponding multiple luma blocks are not flat, the chroma intra prediction with merely the DM will greatly reduce the accuracy of intra prediction, thereby reducing the efficiency for encoding and decoding. Although there are also horizontal and vertical directions as default candidates in the chroma prediction mode, chroma blocks entirely conforming to the horizontal and vertical prediction directions in this case are very few, thereby wasting the candidate positions, which is disadvantageous to the improvement of efficiency for encoding and decoding.

SUMMARY

Embodiments of the present disclosure relate to intra prediction in the field of video coding, and in particular, to a chroma intra prediction method and device.

According to at least some embodiments, there is provided a chroma intra prediction method, applied to a decoder, the method comprising: parsing bitstream data corresponding to a current chroma block, and determining that a prediction mode corresponding to the current chroma block is a direct mode (DM); determining an intra prediction mode of the current chroma block from a set of chroma prediction modes, wherein the set of chroma prediction modes comprises at least one of DM, LM, LM_T or LM_L; and determining a reconstructed value of the current chroma block according to the intra prediction mode.

According to at least some embodiments, there is provided a chroma intra prediction method, applied to an encoder, the method comprising: determining that a prediction mode corresponding to a current chroma block is a direct mode (DM); determining an intra prediction mode of the current chroma block from a set of chroma prediction modes, wherein the set of chroma prediction modes comprises at least one of DM, LM, LM_T or LM_L; and determining a reconstructed value of the current chroma block according to the intra prediction mode.

According to at least some embodiments, there is provided a chroma intra prediction device, applied to a decoder, the device comprising: a processor, a memory storing instructions executable by the processor, a communication interface, and a bus for connecting the processor, the memory and the communication interface, wherein the processor is configured to execute the instructions to perform operations of: parsing bitstream data corresponding to a current chroma block, and determining that a prediction mode corresponding to the current chroma block is a direct mode (DM); determining an intra prediction mode of the current chroma block from a set of chroma prediction modes, wherein the set of chroma prediction modes comprises at least one of DM, LM, LM_T or LM_L; and determining a reconstructed value of the current chroma block according to the intra prediction mode.

According to at least some embodiments, there is provided a chroma intra prediction device, applied to an encoder, the device comprising: a processor, a memory storing instructions executable by the processor, a communication interface, and a bus for connecting the processor, the memory and the communication interface, wherein the processor is configured to execute the instructions to perform operations of: determining that a prediction mode corresponding to a current chroma block is a direct mode (DM); determining an intra prediction mode of the current chroma block from a set of chroma prediction modes, wherein the set of chroma prediction modes comprises at least one of DM, LM, LM_T or LM_L; and determining a reconstructed value of the current chroma block according to the intra prediction mode.

BRIEF DESCRIPTION OF THE DRAWINGS

FIG. 4 is a schematic diagram of vertical prediction.
FIG. 5 is a schematic diagram of horizontal prediction.
FIG. 6 is a schematic diagram of a set of chroma intra candidate modes.

DETAILED DESCRIPTION

Figure 1:
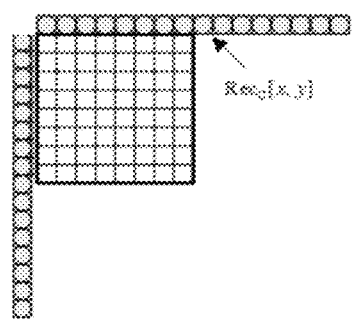
FIG. 1 is a schematic diagram of intra prediction.

The technical solutions in the embodiments of the present disclosure will be clearly and completely described below in conjunction with the accompanying drawings in the embodiments of the present disclosure. It is understandable that the specific embodiments described here are only used to explain the related disclosure, but not to limit the present disclosure. In addition, It is to be noted that for ease of description, only the parts related to the relevant disclosure are illustrated in the drawings.

The spatially or temporally available reconstructed picture is used in video coding to construct the prediction value of the block currently being processed, and only the difference value between the actual value and the prediction value is transmitted in order to reduce the amount of transmitted data. In this case, the intra prediction exploits the spatial correlation within the picture or within the picture region. The intra prediction of the block currently being processed may be performed through samples in adjacent blocks that have already been processed, e.g., using the upper row and left column of the block currently being processed to construct the prediction value of the block currently being processed. FIG. 1 shows a schematic diagram of intra prediction, and as illustrated in FIG. 1, samples from adjacent blocks are used to predict each sample of the block currently being processed.

The selection of the prediction direction is also important when performing intra prediction. Specifically, when constructing the prediction value of the block currently being processed by using the samples of the neighbouring coding blocks, a variety of prediction directions may be used. For example, FIG. 2 shows a schematic diagram of 67 intra prediction modes, and as illustrated in FIG. 2, the 67 intra prediction modes specifically include 65 prediction directions with prediction direction index numbers 2-66, a Planar mode with index number 0 and a DC mode with index number 1.

Figure 2:
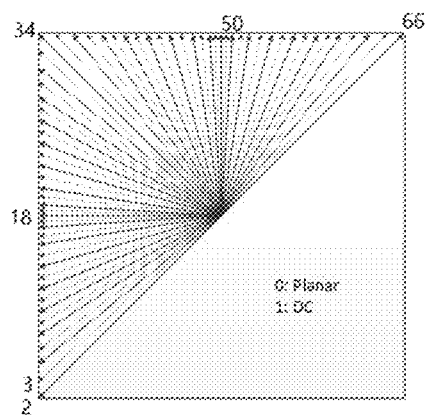
FIG. 2 is a schematic diagram of 67 intra prediction modes.
Figure 3:
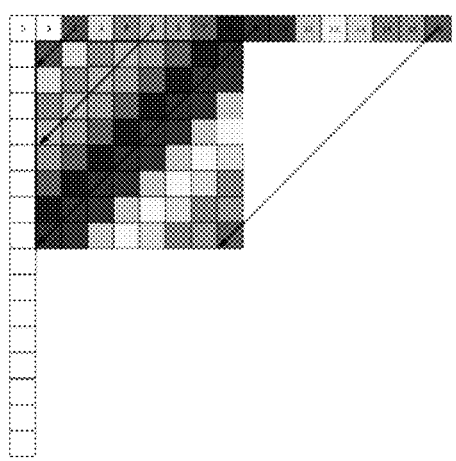
FIG. 3 is a schematic diagram of an intra prediction method.

In the embodiment of the present disclosure, FIG. 3 is a schematic diagram of an intra prediction method based on the above-mentioned FIG. 2. As illustrated in FIG. 3, when constructing the prediction value for each sample with prediction direction index number 66, the samples with numbers 0-16 are the upper row of the block currently being processed. Each sample of the block currently being processed is filled according to samples of the upper right diagonal line.

In the embodiment of the present disclosure, the Planar mode is mainly used for regions where the picture texture is relatively smooth and has a relatively gradual process, and in the prediction method for the Planar mode, the sample values of the reconstructed neighbouring block corresponding to the block currently being processed are used as the reference sample values, and the linear interpolation and averaging calculations are further performed.

Compared with the Planar mode, the DC mode is mainly used for regions with flat pictures, smooth textures, and not much gradient. In the specific prediction method, the prediction is performed based on the last row of decoded reference samples above the block currently being processed and the rightmost column of decoded reference samples to the left of the block currently being processed. It can be seen that in the intra prediction, both the Planar mode and DC mode are modes that construct the prediction block plainly, where the DC mode is to fill the whole chroma block with the average of the reference samples in the upper row and in the left column, and the Planar mode is to fill the chroma block in a gradient way.

In FIG. 2, there are two special direction modes, namely, the VER mode (i.e., the vertical prediction) with prediction direction index number 50 and the HOR mode (i.e., the horizontal prediction) with prediction direction index number 18.

FIG. 4 is a schematic diagram of vertical prediction, and FIG. 5 is a schematic diagram of horizontal prediction. As illustrated in FIG. 4 and FIG. 5, if the prediction direction is the vertical prediction, then the vertical prediction can be performed based on the sample values of the vertically corresponding samples in the upper row; and if the prediction direction is the horizontal prediction, then horizontal prediction can be performed based on the sample values of the horizontally corresponding samples in the left column.

When performing the luma intra prediction, the prediction can be performed according to modes 0-66 in FIG. 2, and then the prediction value is constructed b selecting the prediction direction with the smallest difference value from the block currently being processed, i.e., through selecting the best matched direction. The difference value and the prediction direction are signalled into the bitstream at the encoding end. The decoding end obtains and parses the bitstream, calculate the prediction value of luma after obtaining the prediction direction index number, and adds the prediction value of luma to the difference value signal parsed from the bitstream, to obtain the reconstructed value of luma.

However, chroma intra prediction is different from luma intra prediction. In order to reduce the complexity of encoding and decoding, when performing the chroma intra prediction, only part of the prediction direction is extracted for processing. For example, in VVC, the set of chroma intra candidate modes may include one or more chroma intra prediction modes, such as the linear model (LM) prediction, the Left Linear Model Prediction LM_T mode, the Right Linear Model Prediction LM_L mode, the DC mode, the Planar mode, the vertical VER mode, and the horizontal HOR mode.

FIG. 6 is a schematic diagram of a set of chroma intra candidate modes. As illustrated in FIG. 6, different modes may be included in the set of chroma intra candidate modes, and the chroma intra prediction can be performed through selecting one among the different modes in the prior art. For example, DM may represent the prediction mode corresponding to the central luma block, and the Cross-component Linear Model Prediction CCLM represents constructing the prediction signal with the scheme (a*luminance value+b), where both a and b are natural numbers, and when the DM is any one of the DC mode, Planar mode, VER mode, or HOR mode, the mode may be replaced with an angular mode with prediction direction index number 66.

Figure 7:
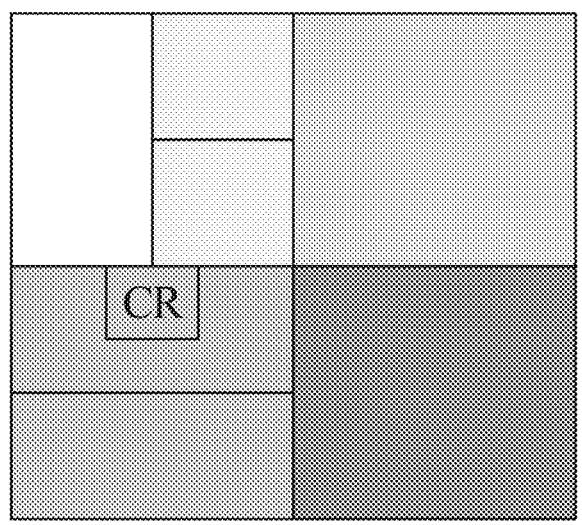
FIG. 7 is a first schematic diagram of chroma blocks and luma blocks.
Figure 8:
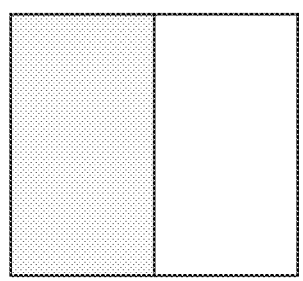
FIG. 8 is a second schematic diagram of chroma blocks and luma blocks.

Further, if the codec framework supports the separate partition for the luma and chroma, that is, the partition for the luma and chroma may be inconsistent, there may be one chroma block corresponding to multiple luma blocks. FIG. 7 is a first schematic diagram of chroma blocks and luma blocks, and FIG. 8 is the second schematic diagram of chroma blocks and luminance blocks. As illustrated in FIG. 7 and FIG. 8, the chroma blocks in FIG. 7 which correspond to the luma blocks in FIG. 8, include 5 parts separately encoded (illustrated with different gray levels). Since the CR under DM can only reflect the local texture features of the chroma block, it is unreasonable to directly use a single DM prediction when the chroma block corresponds to multiple collocated luma blocks. For example, as illustrated in FIG. 7, when the DC mode or Planar mode is selected as the prediction mode for the central luma block, the current block needs to be flat. However, the current luma block in FIG. 7 may not be flat. Although there are also horizontal and vertical directions as default candidates in the chroma prediction modes, the chroma blocks entirely conforming to the horizontal and vertical prediction directions in this case are very few, thereby wasting the candidate positions, which is disadvantageous to the improvement of efficiency for encoding and decoding.

Figure 9:
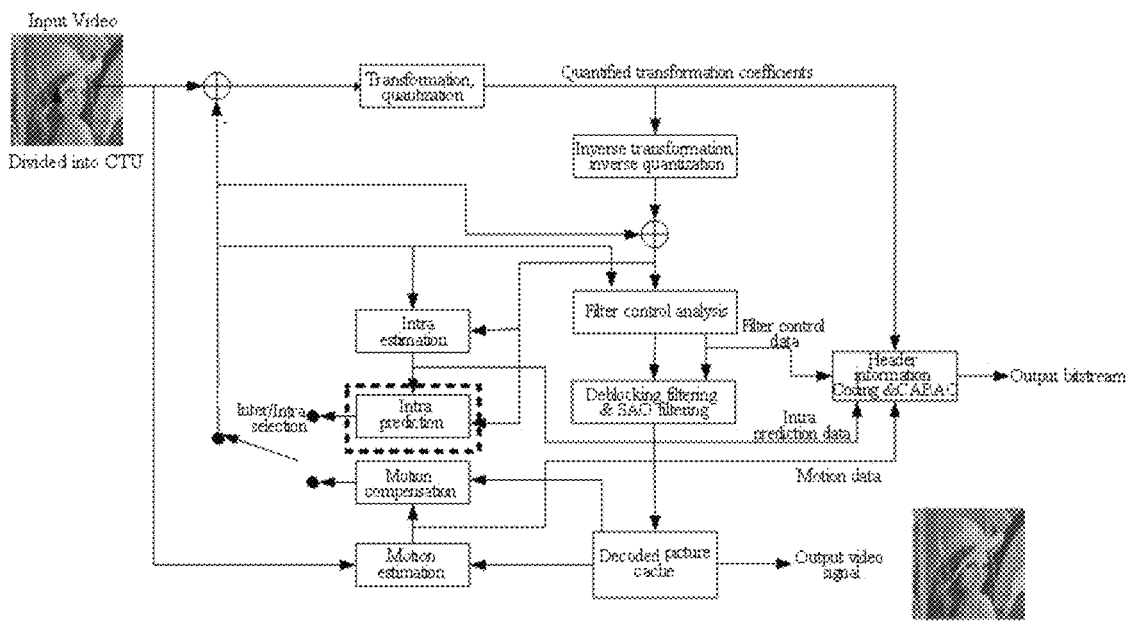
FIG. 9 is a flowchart of a video encoding process.
Figure 10:
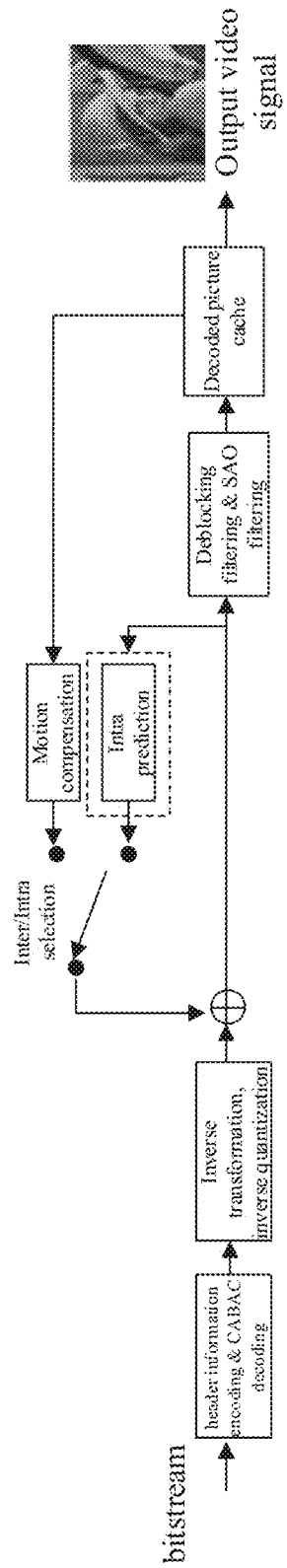
FIG. 10 is a flowchart of a video decoding process.

In the embodiment of the present disclosure, the above chroma intra prediction method may be applied to the intra prediction part of the video coding hybrid framework, and in addition to VVC, it may be also applied to any other video coding hybrid framework. The VVC is used as an example for illustration, and should not be considered as a limitation. Specifically, the above-mentioned chroma intra prediction method may work for both the encoding end and the decoding end. For example, FIG. 9 is a flowchart of a video encoding process. As illustrated in FIG. 9, the video encoding may include multiple specific steps such as intra estimation, intra prediction, and motion compensation. Among them, the chroma intra prediction method provided in the present disclosure may be applied to the intra prediction. FIG. 10 is a flowchart of the video decoding process. As illustrated in FIG. 10, the video decoding may include multiple specific steps such as filtration, intra prediction, and motion compensation. Among them, the chroma intra prediction method provided in the present disclosure may be applied to the intra prediction.

The technical solutions in the embodiments of the present disclosure will be clearly and completely described below in conjunction with the accompanying drawings in the embodiments of the present disclosure.

Figure 11:
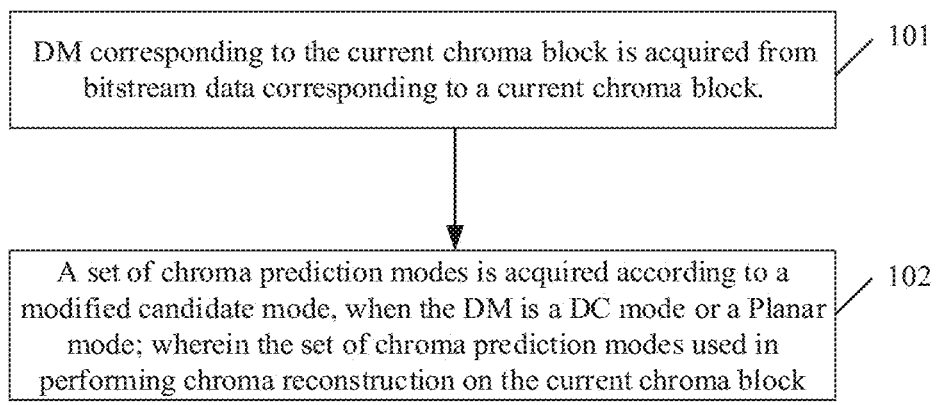
FIG. 11 is a flowchart of a chroma intra prediction method according to an embodiment of the present disclosure.

In an embodiment, the embodiment of the present disclosure provides a chroma intra prediction method. FIG. 11 is a flowchart of a chroma intra prediction method according to an embodiment of the present disclosure. As illustrated in FIG. 11, in the embodiment of the present disclosure, the above-mentioned method for the decoder to perform chroma intra prediction may include Steps 101 and 102.

In step 101, DM corresponding to the current chroma block is acquired from bitstream data corresponding to a current chroma block.

In the embodiment of the present disclosure, the decoder may acquire, from bitstream data corresponding to a current chroma block, a DM corresponding to the current chroma block.

It is to be noted that in the embodiment of the present disclosure, the decoder may first receive the video bitstream and then obtain, from the received video bitstream, the bitstream data corresponding to the current coding block.

In the embodiment of the present disclosure, after acquiring the bitstream data corresponding to the current coding block, the decoder may further obtain, from the above-mentioned bitstream data, the residual data corresponding to the current chroma block.

It is to be noted that, in the embodiment of the present disclosure, when the encoder selects the luma intra prediction mode, the prediction may be performed according to multiple modes. For example, the prediction may be performed according to modes 0-66 in FIG. 2, and then the best matched prediction direction is selected to construct the prediction value. However, when performing chroma intra prediction mode selection, the encoder does not predict all of the above-mentioned modes 0-66, but only extracts some of the prediction directions for prediction and selection. Therefore, after acquiring the bitstream data, the decoder may further construct, from the bitstream data, a set of chroma intra candidates corresponding to the current chroma block, i.e., a set of chroma prediction modes corresponding to the current chroma block.

In the embodiment of the present disclosure, the set of chroma prediction modes may include at least one chroma intra prediction mode. For example, the set of chroma prediction modes may include DM, LM, LM_T, LM_L, DC, Planar, and other directional prediction modes.

In the embodiment of the present disclosure, the current chroma block may be a square chroma block or a rectangular chroma block, which is not specifically limited in the embodiment of the present disclosure.

In step 102, a set of chroma prediction modes is acquired according to a modified candidate mode, when the DM is a DC mode or a Planar mode; wherein the set of chroma prediction modes is for performing chroma reconstruction on the current chroma block.

In the embodiment of the present disclosure, after acquiring, from the bitstream data corresponding to the current chroma block, a DM corresponding to the current chroma block, the decoder acquires a set of chroma prediction modes according to a modified candidate mode when the DM is a DC mode or a Planar mode. Herein, the aforementioned set of chroma prediction modes may be used to perform chroma intra prediction on the aforementioned current chroma block.

It is to be noted that in the embodiment of the present disclosure, the set of chroma prediction modes is used to predict chroma. Specifically, the decoder may perform chroma prediction on the current chroma block through the set of chroma prediction modes, so that reconstruct the chroma corresponding to the above-mentioned current chroma block.

In the embodiment of the present disclosure, after acquiring, from the bitstream data corresponding to the current chroma block, the DM corresponding to the current chroma block, the decoder may determine whether the DM is the DC mode or the Planar mode.

It is to be noted that, in the embodiment of the present disclosure, if the decoder determines that the DM is the DC mode or the Planar mode, the encoder may add the modes according to the modified candidate mode, thereby obtaining the set of chroma prediction modes.

In the embodiment of the present disclosure, after acquiring, from the bitstream data, a DM corresponding to the current chroma block, the decoder may first read and analyze the DM, and then determine whether the DM is the DC mode or the Planar mode.

It is to be noted that in the implementation of the present disclosure, both the Planar mode and the DC mode are methods for constructing the prediction blocks plainly, and therefore, in the DM, when the DC mode or the Planar mode is selected for the central luma block, the luma block may be considered flat. However, this is not the actual situation. For example, in VVC, the luma and chroma are separately partitioned into blocks for encoding. One chroma block may correspond to multiple luma blocks. Therefore, the DM may only reflect the local texture features of the central region, that is, there is a possibility that the luma block is not flat. In other words, when the DM is the Planar mode or the DC mode, it is unreasonable to directly use a single DM to make predictions, which will result in reduced accuracy. Although there are also horizontal and vertical directions as default candidates in the chroma prediction mode, the chroma blocks entirely conforming to the horizontal and vertical prediction directions in this case are very few, thereby wasting the candidate positions, which is disadvantageous to the improvement of efficiency for encoding and decoding.

It is to be noted that in the implementation of the present disclosure, Table 1 is the initial state of the design table for the intra prediction direction. As illustrated in Table 1, when the DM is the DC mode or the Planar mode, the initial state of the prediction direction is the DC mode or the Planar mode; Table 2 is the subsequent state of the design table for the intra prediction direction. As illustrated in Table 2, when the corresponding central luma block is in the Planar mode or DC mode, and if the entire luma block adopts one intra prediction direction, the current block is likely to be flat. In order to ensure the efficiency of the flat block, the flat block will be filled with another flat mode. Herein, the DM and CCLM need to be prioritized because they are important coding tools.

TABLE 1

| DM | CCLM |
|---|---|
| (DC/PLANAR) | |

TABLE 2

| DM | CCLM | another flat mode |
|---|---|---|
| (DC/PLANAR) | | (PLANAR/DC) |

At present, only the flat information of the DC mode or the Planar mode may be obtained through the luma block. In fact, the corresponding chroma block may cover multiple luma block regions, which may contain texture information with directions having different probability distributions.

On the other hand, in the prior art, when the DM is any one of the DC mode, the Planar mode, the VER mode, or the HOR mode, the mode can be replaced with the angular mode with prediction direction index number 66.

However, in practical applications, the VER mode and HOR mode with prediction direction index numbers 18 and 50 have a high percentage, but the probability of texture across the entire chroma block is very small. In contrast, the diagonal mode with prediction direction index numbers 34, 66 and 2 and the nearby direction modes may accurately predict the chroma block with a higher probability.

Since the DM may only reflect the local texture features of the chroma block, when the chroma block corresponds to multiple collocated luma blocks, it is unreasonable to construct a set of chroma prediction modes directly using a single DM prediction with a supplementation of the horizontal mode, vertical mode, and diagonal angular mode with prediction direction index number 66. Therefore, the decoder needs to optimize the set of chroma prediction modes according to the modified candidate mode. In another aspect, since in practical applications, the diagonal angular modes with prediction direction index numbers 34, 66, and 2 and the nearby direction modes may accurately predict the chroma block with a higher probability, these prediction direction modes may be used to replace the original horizontal and vertical prediction direction modes, etc., so as to further supplement the DM.

In an embodiment of the present disclosure, if the DM is the DC mode or the Planar mode, the decoder may further obtain a set of chroma prediction modes for chroma prediction according to the modified candidate mode.

It is to be noted that, in the embodiment of the present disclosure, the decoder may preset at least one mode as the candidate mode, that is, the decoder presets a modified candidate mode.

In the embodiment of the present disclosure, the diagonal angular modes with prediction direction index numbers 34, 66, and 2 are often used for prediction in the small blocks of the luma region corresponding to the current chroma. Therefore, the above-mentioned modified candidate mode may contain the modes with prediction direction index numbers 34, 66 and 2. For example, if the current chroma block is a square chroma block, that is, if the diagonal angular modes of the current chroma block are the modes with prediction direction index number 34, 66, and 2, the mode with the prediction direction index number 34 may be first added to the set of chroma prediction modes, and then one of the modes with the prediction direction index numbers 66 and 2 which is of another diagonal direction is added to the set of chroma prediction modes, when the decoder is acquiring the set of chroma prediction modes according to the modified candidate mode.

In the embodiment of the present disclosure, since the modes with prediction direction index numbers 66 and 2 belong to two directions of the same slope, the decoder may adjust the mode with prediction direction index number 2 clockwise by certain angle, for example, adjust to the mode with prediction direction index number 6, and then use it as a modified candidate mode. At the same time, the decoder may also adjust the mode with prediction direction index number 66 anti-clockwise by one angle, for example, adjust to the mode with prediction direction index number 61, and then use it as a modified candidate mode. Further, the decoder can also adjust the mode with prediction direction index number 66 and the mode with prediction direction index number 2 by one angle at the same time as the modified candidate modes.

In the embodiment of the present disclosure, in addition to the diagonal angular modes which are often used for prediction, other derived angles nearby the diagonal angular modes are also used for prediction. Therefore, the above-mentioned modified candidate modes may contain the modes with prediction direction index numbers 32, 64 and 4. For example, when the decoder is acquiring the set of chroma prediction modes according to the modified candidate mode, the mode with the prediction direction index number 32 may be first added to the set of chroma prediction modes, and then one of the modes with the prediction direction index numbers 64 and 4 is added into the set of chroma prediction modes.

To sum up, in the embodiment of the present disclosure, when establishing the modified candidate mode, the decoder may determine at least one diagonal angular mode as the modified candidate mode; or determine the derived angular mode of at least one diagonal angular mode as the modified candidate mode; or determine at least one diagonal angular mode together with the derived angular mode of at least one diagonal angular mode as the modified candidate modes. Herein, the decoder may first determine the derived angle. Specifically, the decoder may first determine an index number M corresponding to the DM, where M is an integer greater than 0; then the decoder may acquire a transformation parameter N. and determine an index number corresponding to the derived angular mode in accordance with M and N, so as to obtain the derived angular mode; where N is an integer greater than 0.

In the embodiment of the present disclosure, when determining the index number corresponding to the derived angular mode in accordance with M and N, the decoder may either perform an addition operation on M and N, or perform an subtraction operation on M and N to obtain the index number corresponding to the derived angular mode. Herein, N may be equal to but not limited to 3, 5 or 7. For example, the index number M corresponding to the DM is 1 (i.e. the DM is a DC mode), and then the decoder may take the angle direction obtained through 1+5 or 1-5 as the index number corresponding to the derived angular mode. Since the prediction mode is generally not represented by a negative number, a specific mapping method may be used to map the calculated value to the effective representation range. For example, the specific calculation formula may be (M+62-N) %64+2, which yields 60.

In the embodiment of the present disclosure, for the wide-angle mode of non-square blocks, one of the modes with prediction direction index numbers 66 and 2 may be selected as a candidate mode according to the effective prediction direction range thereof, and the angel corresponding to the other prediction direction index number is adjusted as an candidate.

In the embodiment of the present disclosure, after the decoder acquires the set of chroma prediction modes according to the modified candidate mode, that is, after Step 102, the method for the decoder to perform chroma intra prediction may further include Step 103.

In 103, a decoding process is performed according to the set of chroma prediction modes, to perform a chroma reconstruction on the current chroma block.

In the embodiment of the present disclosure, after acquiring the set of chroma prediction modes according to the modified candidate mode, the decoder performs the decoding process according to the set of chroma prediction modes, to perform the chroma reconstruction on the current chroma block.

In the embodiment of the present disclosure, after acquiring the set of chroma prediction modes, the decoder may further perform the decoding process on the current chroma block through the set of chroma prediction modes, so that the current chroma block may be obtained through reconstruction.

It is to be noted that, in the embodiment of the present disclosure, the decoder acquires, from the received video bitstream, the bitstream data corresponding to the current coding block, acquires the DM from the above-mentioned bitstream data, and may further acquire, from the above-mentioned bitstream data, the residual data corresponding to the current chroma block.

In the embodiment of the present disclosure, after acquiring the set of chroma prediction modes according to the modified candidate mode, and further after acquiring, from the above-mentioned bitstream data, the residual data corresponding to the current chroma block, the decoder may perform, based on the set of chroma prediction modes, the chroma intra prediction and decoding on the residual data, so as to reconstruct the current chroma block.

The embodiments of the present disclosure provide the chroma intra prediction method, wherein the decoder acquires, from bitstream data corresponding to a current chroma block, a DM corresponding to the current chroma block; and acquires a set of chroma prediction modes according to a modified candidate mode in a case that the DM is a DC mode or a Planar mode; wherein the set of chroma prediction modes is for performing the chroma reconstruction on the current chroma block. It can be seen that, in the embodiments of the present disclosure, after the decoder acquires the DM from the bitstream data of the current chroma block, if the DM is the DC mode or the Planar mode, the set of chroma prediction modes may be constructed through the modified candidate mode, and then the current chroma block is reconstructed according to the set of chroma prediction modes, thereby solving the problem of low accuracy of chroma intra prediction when the DM is the DC mode or the Planar mode, and further improving the efficiency for encoding and decoding.

Based on the above-mentioned embodiments, in another embodiment of the present disclosure, after acquiring, from bitstream data corresponding to a current chroma block, a DM corresponding to the current chroma block, when the DM is a DC mode or a Planar mode, the decoder acquires a set of chroma prediction modes according to a modified candidate mode, so as to improve the accuracy of decoding.

It is to be noted that in the implementation of the present disclosure, both the Planar mode and the DC mode are methods for constructing the prediction blocks plainly, therefore, in the DM, when the DC mode or the Planar mode is selected for the central luma block, the luma block may be considered flat. However, this is not the actual situation. In VVC, the luma and chroma are separately partitioned into blocks for encoding. One chroma block may correspond to multiple luma blocks. Therefore, the DM may only reflect the local texture features of the central region, that is, there is a possibility that the luma block is not flat. In other words, when the DM is the Planar mode or the DC mode, it is unreasonable to directly use a single DM to make predictions, which will result in reduced accuracy. Although there are also horizontal and vertical directions as default candidates in the chroma prediction mode, the chroma blocks entirely conforming to the horizontal and vertical prediction directions in this case are very few, thereby wasting the candidate positions, which is disadvantageous to the improvement of efficiency for encoding and decoding. Therefore, it requires to obtain the set of chroma prediction modes according to the modified candidate mode. Specifically, before acquiring the set of chroma prediction modes according to the modified candidate mode, the decoder needs to obtain, from the bitstream data, the linear mode (LM) corresponding to the current chroma block.

In the embodiment of the present disclosure, the method for the decoder to acquire the set of chroma prediction modes according to the modified candidate mode may specifically include steps 201 and 202.

In 201, the set of chroma prediction modes is filled with the DM and the LM.

In 202, the set of chroma prediction modes is filled according to the modified candidate mode.

In the embodiment of the present disclosure, the decoder may first fill the set of chroma prediction modes with the DM and LM respectively, so that two modes in the set of chroma prediction modes may be determined first. Then, the decoder may continue to fill the set of chroma prediction modes according to the modified candidate mode, and ultimately obtain the set of chroma prediction modes.

It is to be noted that, in the embodiment of the present disclosure, when the decoder adds the DM and LM to the set of chroma prediction modes, the decoder specifically adds the prediction direction index number of the mode corresponding to DM and the prediction direction index number of the mode corresponding to LM to the set of prediction modes. For example, if the DM is the DC mode and the prediction direction index number of the mode corresponding to the LM is 15, then the decoder can first add the prediction direction index numbers 1 and 15 to the set of chroma prediction modes, and then fill the set of chroma prediction modes according to the modified candidate modes. Specifically, since the DM is the DC mode, the decoder adds the prediction direction index number 0 of the Planar mode to the set of chroma prediction modes when filling the set of chroma prediction modes according to the modified candidate mode.

It is to be noted that, in the embodiment of the present disclosure, the decoder fills the set of chroma prediction modes according to the modified candidate mode may specifically include Steps 202*a* and 202*b*.

In 202*a*, when the DM is the DC mode, the decoder fills the set of chroma prediction modes with the Planar mode and the modified candidate mode.

In the embodiment of the present disclosure, if the DM corresponding to the current chroma block is DC mode, the decoder needs not to modify and replace the Planar mode, and thus the set of chroma prediction modes may be filled with the Planar mode and the modified candidate mode. When the numbers of the bits allocated to the Planar mode and the modified candidate mode are the same, the filling may be in no particular order.

It is to be noted that, in the embodiment of the present disclosure, when the decoder adds the Planar mode and the modified candidate mode to the set of chroma prediction modes, the decoder specifically adds the prediction direction index numbers corresponding to the Planar mode and other modified candidate modes to the set of prediction modes. For example, if the prediction direction index numbers corresponding to other optimization candidate modes are 32 and 61, then the decoder may add prediction direction index numbers 0, 132, and 61 to the set of chroma prediction modes.

In 202*b*, when the DM is the Planar mode, the set of chroma prediction modes is filled with the DC mode and the modified candidate mode.

In the embodiment of the present disclosure, if the DM corresponding to the current chroma block is Planar mode, the decoder need not to modify and replace the DC mode, and thus the set of chroma prediction modes may be filled with the DC mode and the modified candidate mode. When the numbers of the bits allocated to the DC mode and the modified candidate mode are the same, the filling may be in no particular order.

It is to be noted that, in the embodiment of the present disclosure, when the decoder adds the DC mode and the modified candidate mode to the set of chroma prediction modes, the decoder specifically adds the prediction direction index numbers corresponding to the DC mode and other modified candidate modes to the set of prediction modes. For example, if the prediction direction index numbers corresponding to other optimization candidate modes are 2 and 60, then the decoder may add prediction direction index numbers 1, 2, and 60 to the set of chroma prediction modes.

In the embodiment of the present disclosure, the method for the decoder to add the modified candidate mode to the set of chroma prediction modes may further include Steps 301 and 302.

In 301, a priority of at least one of the modified candidate modes is determined.

In the embodiment of the present disclosure, the decoder may first determine the priority of at least one of the modified candidate modes.

It is to be noted that, in the embodiment of the present disclosure, the modified candidate modes may include at least one mode; specially, the at least one mode have different prediction direction index numbers.

It is to be noted that, in the embodiment of the present disclosure, the decoder may determine the priority in accordance with the probability of actual use of the at least one mode.

In 302, the modified candidate modes are added to the set of chroma prediction modes respectively in order of priority from highest to lowest.

In the embodiment of the present disclosure, after determining the priority of at least one of the modified candidate modes, the decoder further adds the modified candidate modes to the set of chroma prediction modes in order of priority from highest to lowest.

In the embodiment of the present disclosure, during adding the modified candidate modes to the set of chroma prediction modes, the decoder may first add the modified candidate mode with the highest priority, and then select, in order of priority from highest to lowest, the next modified candidate mode to construct the set of chroma prediction modes.

It is to be noted that, in the embodiment of the present disclosure, when the decoder adds the modified candidate mode to the set of chroma prediction modes, the decoder specifically adds the prediction direction index numbers corresponding to the modified candidate modes to the set of prediction modes.

In other words, if the decoder may construct the set of chroma prediction modes according to the preset modified candidate mode, the accuracy of the prediction may be improved.

The embodiments of the present disclosure provide the chroma intra prediction method, where the decoder acquires, from bitstream data corresponding to a current chroma block, a DM corresponding to the current chroma block; and the decoder acquires a set of chroma prediction modes according to a modified candidate mode when the DM is a DC mode or a Planar mode; wherein the set of chroma prediction modes is for performing a chroma reconstruction on the current chroma block. It can be seen that, in the embodiments of the present disclosure, after the decoder acquires the DM from the bitstream data of the current chroma block, if the DM is in the DC mode or the Planar mode, the set of chroma prediction modes may be constructed through the modified candidate mode, and then the current chroma block is reconstructed according to the set of chroma prediction modes, thereby solving the problem of low accuracy of chroma intra prediction when the DM is the DC mode or the Planar mode, and further improving the efficiency for encoding and decoding.

In the embodiment of the present disclosure, the current chroma block includes a square chroma block and a non-square chroma block. On this basis, when establishing the modified candidate mode, the decoder may determine at least one diagonal angular mode as the modified candidate mode, or determine the derived angular mode of at least one diagonal angular mode as the modified candidate mode, or determine at least one diagonal angular mode together with the derived angular mode of at least one diagonal angular mode as the modified candidate modes.

Figure 12:
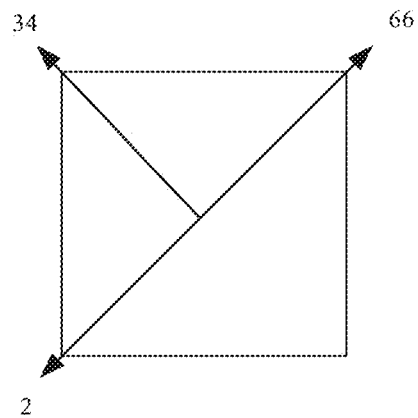
FIG. 12 is a first schematic diagram of establishing the modified candidate mode.

In the embodiment of the present disclosure, the decoder may determine at least one diagonal angular mode as the modified candidate mode. Specifically, if the current chroma block is a square chroma block, that is, the diagonal angular modes of the current chroma block are the modes with prediction direction index numbers 34, 66, and 2, the diagonal angular modes with prediction direction index numbers 34, 66 and 2 are more often used for predictions. FIG. 12 is a first schematic diagram of establishing the modified candidate mode. As illustrated in FIG. 12, the decoder may first determine one diagonal prediction mode, i.e., the mode with the prediction direction index number 34, as the above-mentioned modified candidate mode, and then may determine another diagonal angle direction, i.e., any one of the modes with the prediction direction index numbers 66 and 2, as the above-mentioned modified candidate mode.

Figure 13:
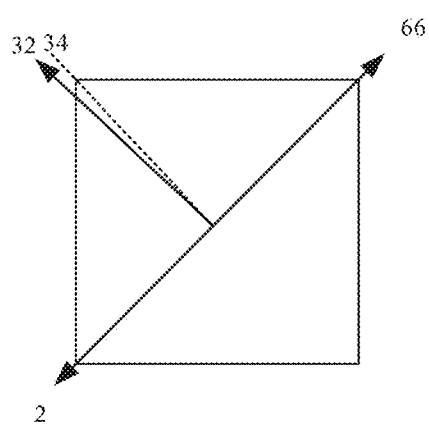
FIG. 13 is a second schematic diagram of establishing the modified candidate mode.

In the embodiment of the present disclosure, the decoder may alternatively determine the derived angular mode of the at least one diagonal angular mode as the modified candidate mode. Specifically, if the current chroma block is a square chroma block, that is, the diagonal angular modes of the current chroma block are the modes with the prediction direction index numbers 34, 66, and 2, in addition to the diagonal angular modes often used to make predictions, other derived angles near the diagonal angular modes are also often used for making predictions. FIG. 13 is a second schematic diagram of establishing the modified candidate mode. As illustrated in FIG. 13, the decoder may first determine one derived angle prediction mode, i.e., the mode with the prediction direction index number 32, as the above-mentioned modified candidate mode, and then may determine any one of the modes with the prediction direction index numbers 66 and 2 as the above-mentioned modified candidate mode.

In the embodiment of the present disclosure, the decoder may first determine at least one derived angular modes. Specifically, the decoder may first determine an index number M corresponding to the DM; where M is an integer greater than 0; then the decoder may acquire a transformation parameter N, and determine an index number corresponding to the derived angular mode in accordance with M and N, so as to obtain the derived angular mode; where N is an integer greater than 0.

In the embodiment of the present disclosure, when determining the index number corresponding to the derived angular mode in accordance with M and N, the decoder may either perform an addition operation on M and N. or perform a subtraction operation on M and N. and ultimately obtains the index number corresponding to the derived angular mode. Herein, N may be equal to 3, 5 or 7. For example, based on FIG. 2, when the index number M corresponding to DM is 0 (i.e. the DM is a Planar mode), the decoder may take the angle direction obtained through 0+5 or 0−5 as the index number corresponding to the derived angular mode. Since the prediction mode is generally not represented by a negative number, a specific mapping method may be used to map the calculated value to the effective representation range. For example, the specific calculation formula may be (M+62−N) %64+2, which yields 60. That is, the derived angular modes with the prediction direction angle 5 and with the prediction direction angle 60 may be obtained in this case.

Figure 14:
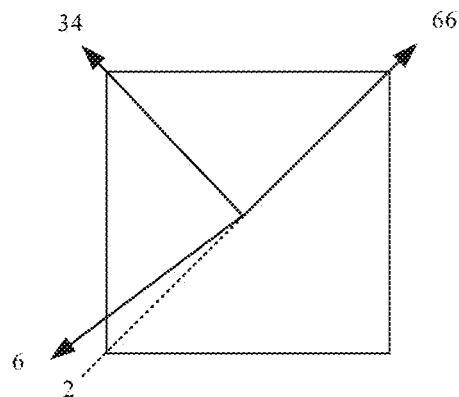
FIG. 14 is a third schematic diagram of establishing the modified candidate mode.
Figure 15:
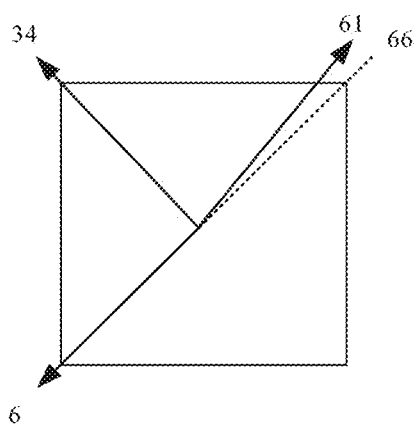
FIG. 15 is a fourth schematic diagram of establishing the modified candidate mode.
Figure 16:
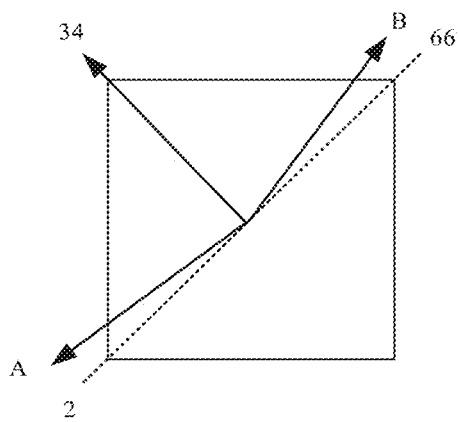
FIG. 16 is a fifth schematic diagram of establishing the modified candidate mode.

In the embodiment of the present disclosure, since the modes with prediction direction index numbers 66 and 2 belong to two directions of the same slope, the decoder may adjust the mode with prediction direction index number 2 clockwise by an angle and then use it as a modified candidate mode. For example, FIG. 14 is a third schematic diagram of establishing a modified candidate mode. As illustrated in FIG. 14, the decoder adjusts the mode with prediction direction index number 2 to the mode with prediction direction index number 6. At the same time, the decoder may also adjust the mode with prediction direction index number 66 anti-clockwise by an angle and then use it as a modified candidate mode. For example, FIG. 15 is a fourth schematic diagram of establishing a modified candidate mode. As illustrated in FIG. 15, the decoder adjusts the mode with prediction direction index number 66 to the mode with prediction direction index number 61. Further, the decoder may also adjust the mode with prediction direction index number 66 and the mode with prediction direction index number 2 by one angle respectively at the same time as the modified candidate modes. For example, FIG. 16 is a fifth schematic diagram of establishing a modified candidate mode. As illustrated in FIG. 16, the decoder adjusts the mode with prediction direction index number 66 to the mode with prediction direction index number B, and adjusts the mode with prediction direction index number 2 to the mode with prediction direction index number A.

It is to be noted that, in the embodiment of the present disclosure, when the decoder constructs the set of chroma prediction modes according to the modified candidate mode, the diagonal angular mode and the derived angular mode may be freely combined. For example, if three modified candidate modes are required to construct the set of chroma prediction modes, then one diagonal angular mode and two derived angular modes may be added to the set of chroma prediction modes, or two diagonal angular modes and one derived angular mode may be added to the set of chroma prediction modes, or three derived angular modes may be added to the set of chroma prediction modes, or three diagonal angular modes may be added to set of chroma prediction modes. For example, w % ben the decoder constructs the set of chroma prediction modes according to the modified candidate mode, angular modes 6, 61 and 66 may be added to the set of chroma prediction modes, or angular modes 6, 61 and 34 may be added to the set of chroma prediction modes, or angular modes 6, 61, 40 may be added to the set of chroma prediction modes, which are not specifically limited in the embodiment of the present disclosure.

In the embodiment of the present disclosure, for the wide-angle mode of long blocks, one of the modes with prediction direction index numbers 66 and 2 may be selected as an candidate mode according to its effective prediction direction range, and the angel corresponding to the other prediction direction index number may be adjusted as an candidate mode.

The present disclosure provides the chroma intra prediction method, where the decoder acquires, from bitstream data corresponding to a current chroma block, a DM corresponding to the current chroma block; and acquires a set of chroma prediction modes according to a modified candidate mode when the DM is a DC mode or a Planar mode; wherein the set of chroma prediction modes is for performing chroma reconstruction on the current chroma block. It can be seen that, in the embodiments of the present disclosure, after the decoder acquires the DM from the bitstream data of the current chroma block, if the DM is the DC mode or the Planar mode, the set of chroma prediction modes may be constructed through the modified candidate mode, and then the current chroma block is reconstructed according to the set of chroma prediction modes, thereby solving the problem of low accuracy of chroma intra prediction when the DM is the DC mode or the Planar mode, and further improving the efficiency for encoding and decoding.

Figure 17:
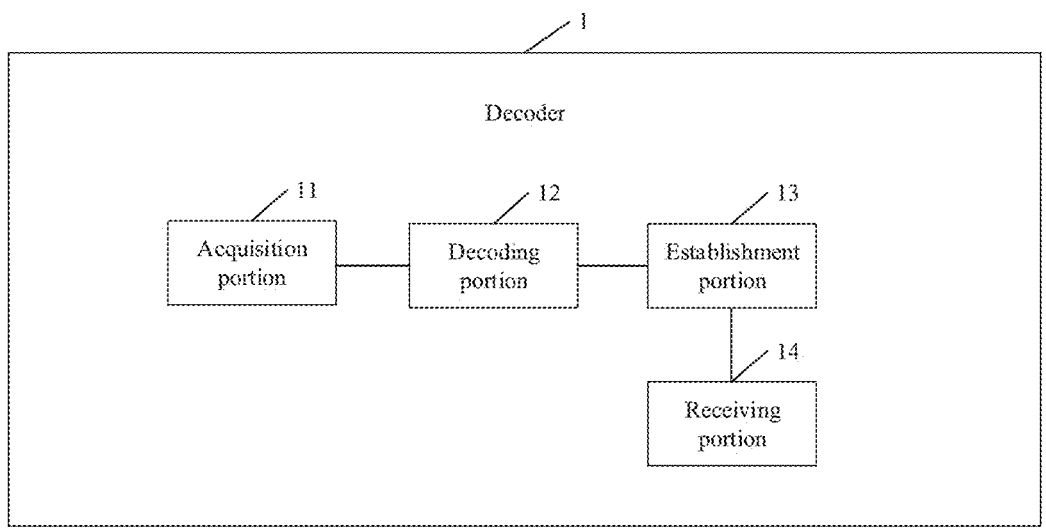
FIG. 17 is a first schematic structure diagram of a decoder according to an embodiment of the present disclosure.

Based on the above-mentioned embodiment, a further embodiment of the present disclosure is provided. FIG. 17 is a first schematic structure diagram of a decoder according to an embodiment of the present disclosure. As illustrated in FIG. 17, the decoder 1 provided in the embodiment of the present disclosure may include an acquisition portion 11, a decoding portion 12, an establishment portion 13, and a receiving portion 14.

The acquisition portion 11 is configured to acquire, from bitstream data corresponding to a current chroma block, a DM corresponding to the current chroma block; and acquire a set of chroma prediction modes according to a modified candidate mode, in case where the DM is a DC mode or a Planar mode; wherein the set of chroma prediction modes is for performing chroma reconstruction on the current chroma block.

In the embodiment of the present disclosure, the acquisition portion 11 is further configured to acquire, from the bitstream data, a LM corresponding to the current chroma block, before acquiring the set of chroma prediction modes according to the modified candidate mode.

In the embodiment of the present disclosure, the acquisition portion 11 is specifically configured to fill the set of chroma prediction modes with the DM and the LM; and fill the set of chroma prediction modes in accordance with modified candidate mode.

In the embodiment of the present disclosure, the acquisition portion 11 is further specifically configured to: when the DM is the DC mode, fill the set of chroma prediction modes with the Planar mode and the modified candidate mode; and when the DM is the Planar mode, fill the set of chroma prediction modes with the DC mode and the modified candidate mode.

In the embodiment of the present disclosure, the modified candidate mode comprises at least one mode; wherein the at least one mode have different prediction direction index numbers.

In the embodiment of the present disclosure, the establishment portion 13 is configured to establish the modified candidate mode, before acquiring the set of chroma prediction modes according to the modified candidate mode.

In the embodiment of the present disclosure, the establishment portion 13 is specifically configured to determine at least one diagonal angular mode as the modified candidate mode; or, determine a derived angular mode of the at least one diagonal angular mode as the modified candidate mode; or, determine the derived angular mode of the at least one diagonal angular mode and the at least one diagonal angular mode as the modified candidate modes.

In the embodiment of the present disclosure, the acquisition portion 11 is further configured to determine an index number M corresponding to the DM before establishing the modified candidate mode; wherein M is an integer greater than 0; acquire a transformation parameter N, and determine, in accordance with M and N, an index number corresponding to the derived angular mode, so as to obtain the derived angular mode; wherein the N is an integer greater than 0.

In the embodiment of the present disclosure, the acquisition portion 11 is specifically configured to perform an addition operation on M and N to obtain the index number corresponding to the derived angular mode; or, perform an subtraction operation on M and N to obtain the index number corresponding to the derived angular mode.

In the embodiment of the present disclosure, N includes 3, 5, or 7.

In the embodiment of the present disclosure, the current chroma block includes a square chroma block and a non-square chroma block.

In the embodiment of the present disclosure, the receiving portion 14 is configured to receive a video bitstream to acquire the bitstream data, before acquiring, from the bitstream data corresponding to the current chroma block, the DM corresponding to the current chroma block.

In the embodiment of the present disclosure, the decoding portion 12 is configured to: after acquiring the set of chroma prediction modes according to the modified candidate mode, perform a decoding process according to the set of chroma prediction modes, to perform a chroma block reconstruction on the current chroma block.

In the embodiment of the present disclosure, the acquisition portion 11 is further configured to acquire, from the bitstream data, residual data corresponding to the current chroma block, before performing the decoding process according to the set of chroma prediction modes to perform the chroma block reconstruction on the current chroma block.

In the embodiment of the present disclosure, the decoding portion 12 is specifically configured to perform chroma intra prediction decoding on the residual data based on the set of chroma prediction modes, to perform a chroma reconstruction on the current chroma block.

In the embodiment of the present disclosure, the acquisition portion 11 is further configured to: when there are identical prediction modes among the prediction modes corresponding to the current chroma block obtained from the bitstream data, acquire the set of chroma prediction modes according to the modified candidate mode, to perform chroma reconstruction on the current chroma block, after receiving the video bitstream to acquire the bitstream data.

The embodiments of the present disclosure provide the chroma intra prediction method, the decoder and the computer storage medium, wherein the decoder acquires, from bitstream data corresponding to a current chroma block, a direct mode (DM) corresponding to the current chroma block; and acquire a set of chroma prediction modes according to a modified candidate mode, when the DM is a direct current (DC) mode or a Planar mode; wherein the set of chroma prediction modes is for performing a chroma reconstruction on the current chroma block. It can be seen that, in the embodiments of the present disclosure, after the decoder acquires the DM from the bitstream data of the current chroma block, if the DM is the DC mode or the Planar mode, the modified candidate mode may be used to construct the set of chroma prediction modes, and then the current chroma block may be reconstructed according to the set of chroma prediction modes, thereby solving the problem of low accuracy of chroma intra prediction when the DM is the DC mode or the Planar mode, and further improving the efficiency for encoding and decoding.

Figure 18:
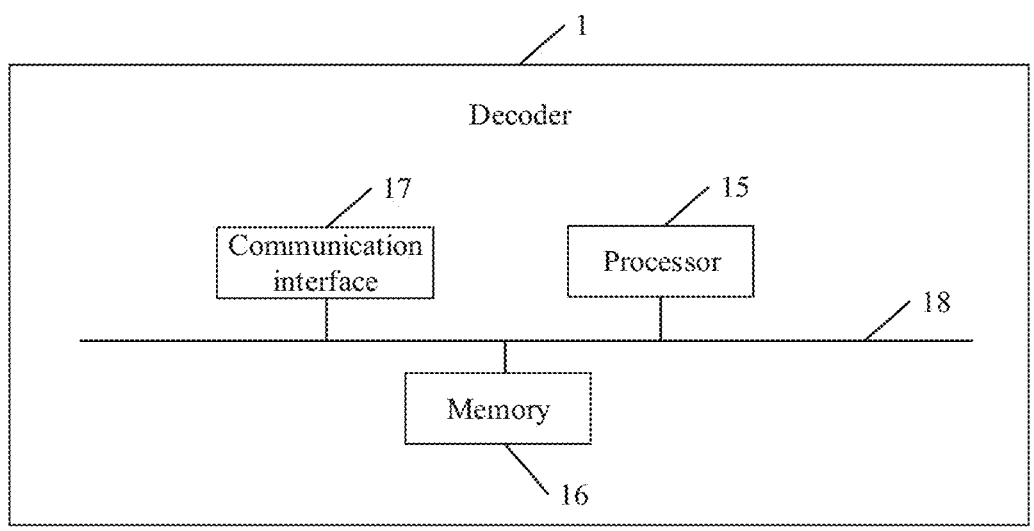
FIG. 18 is a second schematic structure diagram of a decoder according to an embodiment of the present disclosure.

FIG. 18 is a second schematic structure diagram of the decoder provided in the embodiment of the present disclosure. As illustrated in FIG. 18, the decoder 1 provided in the embodiment of the present disclosure may further include a processor 15 and a memory 16 storing instructions executable by the processor 15, a communication interface 17, and a bus 18 for connecting the processor 15, the memory 16, and the communication interface 17.

In the embodiment of the present disclosure, the above-mentioned processor 15 may be at least one of an Application Specific Integrated Circuit (ASIC), a Digital Signal Processor (DSP), a Digital Signal Processing Device (DSPD), a ProgRAMmable Logic Device (PLD), a Field ProgRAMmable Gate Array (FPGA), a Central Processing Unit (CPU), a controller, a microcontroller, and a microprocessor. It can be understood that, for different devices, the electronic elements for implementing the above-mentioned processor functions may be alternatively in another type, which is not specifically limited in the embodiment of the present disclosure. The device 1 may further include a memory 16, which may be connected to the processor 15, wherein the memory 16 is for storing an executable program code including computer operation instructions, and the memory 16 may include a high-speed RAM memory, or may further include a Non-volatile memory, such as at least two disk memories.

In the embodiment of the present disclosure, the bus 18 is for connecting the communication interface 17, the processor 15, the memory 16, and the mutual communications among these devices.

In the embodiment of the present disclosure, the memory 16 is for storing the instructions and data.

Further, in the embodiment of the present disclosure, the aforementioned processor 15 is configured to acquire, from bitstream data corresponding to a current chroma block, a DM corresponding to the current chroma block; and acquire a set of chroma prediction modes according to a modified candidate mode when the DM is a DC mode or a Planar mode; wherein the set of chroma prediction modes is for performing a chroma reconstruction on the current chroma block.

In practical applications, the above-mentioned memory 16 may be a first volatile memory (volatile memory), such as a Random-Access Memory (RAM); or a first non-volatile memory (non-volatile memory), such as a first Read-Only Memory (ROM), a first flash memory, a Hard Disk Drive (HDD), or a Solid-State Drive (SSD); or a combination of the above-mentioned types of first memory, and provides instructions and data to the processor 15.

In addition, the functional modules in this embodiment may be integrated into one processing unit, or the respective modules may physically exist separately, or two or more modules may be integrated into one unit. The above-mentioned integrated unit may be realized in the form of hardware or in the form of a software function module.

The integrated unit, when implemented as a software function module and not sold or used as a stand-alone product, may be stored in a computer-readable storage medium. Based on such understanding, the essential technical solution of the embodiments, or the part that contributes to the prior art, or all or part of the technical solution, may be embodied in the form of a software product stored in a storage medium including a number of instructions to enable a computer device (which may be a personal computer, a server, or a network device, etc.) or a processor to perform all or some of the steps of the method in the embodiments. The aforementioned storage medium includes various mediums that can store a program code, such as a USB flash drive, a removable hard disk, a Read Only Memory (ROM), a Random Access Memory (RAM), a disk or a compact disc.

The embodiments of the present disclosure provide a device, wherein the decoder acquires, from bitstream data corresponding to a current chroma block, a DM corresponding to the current chroma block; and acquires a set of chroma prediction modes according to a modified candidate mode, when the DM is a DC mode or a Planar mode; wherein the set of chroma prediction modes is for performing a chroma reconstruction on the current chroma block. It can be seen that, in the embodiments of the present disclosure, after the decoder acquires the DM from the bitstream data of the current chroma block, if the DM is the DC mode or the Planar mode, the modified candidate mode may be used to construct the set of chroma prediction modes, and then the current chroma block is reconstructed according to the set of chroma prediction modes, thereby solving the problem of low accuracy of chroma intra prediction when the DM is the DC mode or the Planar mode, and further improving the efficiency for encoding and decoding.

An embodiment of the present disclosure provides a computer readable storage medium storing a program thereon, wherein the program implements, when executed by a processor, the chroma intra prediction methods as described above.

Specifically, the program instructions corresponding to a chroma intra prediction method in this embodiment may be stored on a storage medium such as optical disks, hard disks, and USB flash drives. When the program instructions corresponding to the chroma intra prediction method in the storage medium are read or executed by an electronic device, the following steps are performed:

acquiring, from bitstream data corresponding to a current chroma block, a DM corresponding to the current chroma block; and acquiring a set of chroma prediction modes according to a modified candidate mode, when the DM is a direct current (DC) mode or a Planar mode;

wherein, the set of chroma prediction modes is for performing a chroma reconstruction on the current chroma block.

Those skilled in the art should understand that the embodiments of the present disclosure may be provided as methods, systems, or computer program products. Therefore, the present disclosure may adopt the form of hardware embodiments, software embodiments, or embodiments combining software and hardware. Moreover, the present disclosure may adopt the form of a computer program product implemented on one or more computer-usable storage medium (including but not limited to a disk storage, an optical storage, etc.) containing computer-usable program codes therein.

The present disclosure is described with reference to the flowcharts and/or block diagrams of the methods, equipments (systems), and computer program products according to the embodiments of the present disclosure. It should be understood that the computer program instructions may be used to implement each process and/or block in the flowchart and/or block diagram, and to implement a combination of processes and/or blocks in the flowchart and/or block diagram. These computer program instructions may be provided to the processor of a general-purpose computer, a special-purpose computer, an embedded processor, or another programmable data processing equipment to generate a machine, so that the instructions executed by the processor of the computer or another programmable data processing equipment may generate a device for implementing the functions specified in one or more process in the flowchart and/or in one or more block in the block diagram.

These computer program instructions may be alternatively stored in a computer-readable memory that can guide a computer or another programmable data processing equipment to work in a specific manner, so that the instructions stored in the computer-readable memory produce a manufacture including the instruction device. The instruction device realizes the functions specified in one or more processes in the flowchart and/or one or more blocks in the block diagram.

These computer program instructions may be alternatively loaded on a computer or another programmable data processing equipment, so that a series of operation steps are performed on the computer or another programmable equipment to produce the computer-implemented processing, and the instructions executed on the computer or another programmable equipment provide steps for implementing the functions specified in one or more processes in the flowchart and/or one or more block in the block diagram.

The above is only the preferred embodiments of the present disclosure and not intended to limit the scope of protection of the present disclosure.

INDUSTRIAL APPLICABILITY

The embodiments of the present disclosure provide the chroma intra prediction method, the decoder and the computer storage medium, wherein the decoder acquires, from bitstream data corresponding to a current chroma block, a DM corresponding to the current chroma block; and acquires a set of chroma prediction modes according to a modified candidate mode, when the DM is a DC mode or a Planar mode; wherein the set of chroma prediction modes is for performing a chroma reconstruction on the current chroma block. It can be seen that, in the embodiments of the present disclosure, after the decoder acquires the DM from the bitstream data of the current chroma block, if the DM is the DC mode or the Planar mode, the set of chroma prediction modes may be constructed through the modified candidate mode, and then the current chroma block is reconstructed according to the set of chroma prediction modes, thereby solving the problem of low accuracy of chroma intra prediction when the DM is the DC mode or the Planar mode, and further improving the efficiency for encoding and decoding.

The invention claimed is:

1. A chroma intra prediction method, applied to a decoder, the method comprising:
 parsing bitstream data corresponding to a current chroma block, and determining that a prediction mode corresponding to the current chroma block is a direct mode (DM);
 before determining a set of chroma prediction modes based on at least one modified candidate mode, acquiring a linear mode corresponding to the current chroma block from the bitstream data;
 determining an intra prediction mode of the current chroma block from a set of chroma prediction modes, wherein the set of chroma prediction modes comprises at least one of the DM or the linear mode; and
 determining a reconstructed value of the current chroma block according to the intra prediction mode.

2. The method of claim 1, wherein when a luma prediction mode corresponding to the DM is a direct current (DC) mode or a planar mode, the set of chroma prediction modes comprises a diagonal angular mode with prediction direction index number 66.

3. The method of claim 1, further comprising determining the at least one modified candidate mode, wherein:
 when a luma prediction mode corresponding to the DM is a direct current (DC) mode or a planar mode, the set of chroma prediction modes is determined based on the at least one modified candidate mode; and
 determining the at least one modified candidate mode comprises adjusting a mode with a prediction direction index number 66 by a first angle in a first angular direction and adjusting a mode with a prediction direction index number 2 by the first angle in a direction opposite to the first angular direction to obtain derived angles of the at least one modified candidate mode;
 the prediction direction index number 66 points in a top-right direction; and
 the prediction direction index number 2 points in a bottom-left direction.

4. The method of claim 2, wherein
 when a luma prediction mode corresponding to the DM is the DC mode, the set of chroma prediction modes is determined at least according to the Planar mode and the at least one modified candidate mode, and
 when a luma prediction mode corresponding to the DM is the Planar mode, the set of chroma prediction modes is determined at least according to the DC mode and the at least one modified candidate mode.

5. The method of claim 1, wherein when a luma prediction mode corresponding to the DM is one of a DC mode, Planar mode, VER mode or HOR mode, the set of chroma prediction modes comprises an angular mode with an index number 66.

6. A chroma intra prediction method, applied to an encoder, the method comprising:
 determining that a prediction mode corresponding to a current chroma block is a direct mode (DM);
 before determining a set of chroma prediction modes based on at least one modified candidate mode, acquiring a linear mode corresponding to the current chroma block from bitstream data;
 determining an intra prediction mode of the current chroma block from a set of chroma prediction modes, wherein the set of chroma prediction modes comprises at least one of the DM or the linear mode; and
 determining a reconstructed value of the current chroma block according to the intra prediction mode.

7. The method of claim 6, wherein when a luma prediction mode corresponding to the DM is a direct current (DC) mode or a planar mode, the set of chroma prediction modes comprises a diagonal angular mode with prediction direction index number 66 pointing towards the top-right direction.

8. The method of claim 6, further comprising determining the at least one modified candidate mode wherein:
 when a luma prediction mode corresponding to the DM is a direct current (DC) mode or a planar mode, the set of chroma prediction modes is determined based on the at least one modified candidate mode; and
 determining the at least one modified candidate mode comprises adjusting a mode with a prediction direction index number 66 by a first angle in a first angular direction and adjusting a mode with a prediction direction index number 2 by the first angle in a direction opposite to the first angular direction to obtain derived angles of the at least one modified candidate mode;
 the prediction direction index number 66 points in a top-right direction; and
 the prediction direction index number 2 points in a bottom-left direction.

9. The method of claim 7, wherein
 when a luma prediction mode corresponding to the DM is the DC mode, the set of chroma prediction modes is determined at least according to the Planar mode and the at least one modified candidate mode,
 when a luma prediction mode corresponding to the DM is the Planar mode, the set of chroma prediction modes is determined at least according to the DC mode and the at least one modified candidate mode.

10. The method of claim 6, wherein when a luma prediction mode corresponding to the DM is one of a DC mode, Planar mode, VER mode or HOR mode, the set of chroma prediction modes comprises an angular mode with an index number 66.

11. A chroma intra prediction device, applied to a decoder, the device comprising:
 a processor, a memory storing instructions executable by the processor, a communication interface, and a bus for connecting the processor, the memory and the communication interface, wherein the processor is configured to execute the instructions to perform operations of:
  parsing bitstream data corresponding to a current chroma block, and determining that a prediction mode corresponding to the current chroma block is a direct mode (DM);

before determining a set of chroma prediction modes based on at least one modified candidate mode, acquiring a linear mode corresponding to the current chroma block from the bitstream data;

determining an intra prediction mode of the current chroma block from a set of chroma prediction modes, wherein the set of chroma prediction modes comprises at least one of the DM or the linear mode; and determining a reconstructed value of the current chroma block according to the intra prediction mode.

12. The device of claim 11, wherein when a luma prediction mode corresponding to the DM is a direct current (DC) mode or a planar mode, the set of chroma prediction modes comprises a diagonal angular mode with prediction direction index number 66.

13. The device of claim 11, further comprising determining the at least one modified candidate mode, wherein:

when a luma prediction mode corresponding to the DM is a direct current (DC) mode or a planar mode, the set of chroma prediction modes is determined based on the at least one modified candidate mode; and determining the at least one modified candidate mode comprises adjusting a mode with a prediction direction index number 66 by a first angle in a first angular direction and adjusting a mode with a prediction direction index number 2 by the first angle in a direction opposite to the first angular direction to obtain derived angles of the at least one modified candidate mode;

the prediction direction index number 66 points in a top-right direction; and the prediction direction index number 2 points in a bottom-left direction.

14. The device of claim 12, wherein:

when a luma prediction mode corresponding to the DM is the DC mode, the set of chroma prediction modes is determined at least according to the Planar mode and the at least one modified candidate mode; and when a luma prediction mode corresponding to the DM is the Planar mode, the set of chroma prediction modes is determined at least according to the DC mode and the at least one modified candidate mode.

15. The device of claim 11, when a luma prediction mode corresponding to the DM is one of a DC mode, Planar mode, VER mode or HOR mode, the set of chroma prediction modes comprises an angular mode with an index number 66.

16. A chroma intra prediction device, applied to an encoder, the device comprising:

a processor, a memory storing instructions executable by the processor, a communication interface, and a bus for connecting the processor, the memory and the communication interface, wherein the processor is configured to execute the instructions to perform operations of:

determining that a prediction mode corresponding to a current chroma block is a direct mode (DM);

before determining a set of chroma prediction modes based on at least one modified candidate mode, acquiring a linear mode corresponding to the current chroma block from bitstream data;

determining an intra prediction mode of the current chroma block from a set of chroma prediction modes, wherein the set of chroma prediction modes comprises at least one of the DM or the linear mode; and determining a reconstructed value of the current chroma block according to the intra prediction mode.

17. The device of claim 16, wherein when a luma prediction mode corresponding to the DM is a direct current (DC) mode or a planar mode, the set of chroma prediction modes comprises a diagonal angular mode with prediction direction index number 66.

18. The device of claim 16, further comprising determining the at least one modified candidate mode, wherein:

when a luma prediction mode corresponding to the DM is a direct current (DC) mode or a planar mode, the set of chroma prediction modes is determined based on the at least one modified candidate mode; and determining the modified candidate modes comprises adjusting a mode with a prediction direction index number 66 by a first angle in a first angular direction and adjusting a mode with a prediction direction index number 2 by the first angle in a direction opposite to the first angular direction to obtain derived angles of the modified candidate modes;

the prediction direction index number 66 points in a top-right direction; and the prediction direction index number 2 points in a bottom-left direction.

19. The device of claim 17, wherein when a luma prediction mode corresponding to the DM is the DC mode, the set of chroma prediction modes is determined at least according to the Planar mode and the at least one modified candidate mode, when a luma prediction mode corresponding to the DM is the Planar mode, the set of chroma prediction modes is determined at least according to the DC mode and the at least one modified candidate mode.

20. The device of claim 16, wherein when a luma prediction mode corresponding to the DM is one of a DC mode, Planar mode, VER mode or HOR mode, the set of chroma prediction modes comprises an angular mode with an index number 66.

21. The method of claim 1, wherein when a luma prediction mode corresponding to the DM is a direct current (DC) mode or a planar mode, the intra prediction mode comprises at least one of a diagonal angular mode with prediction direction index number 34 pointing in the top-left direction or a diagonal angular mode with prediction direction index number 2 pointing in the bottom-left direction.

22. The method of claim 1, wherein the linear mode is LM, LM_T or LM_L.

* * * * *